UNITED STATES PATENT OFFICE.

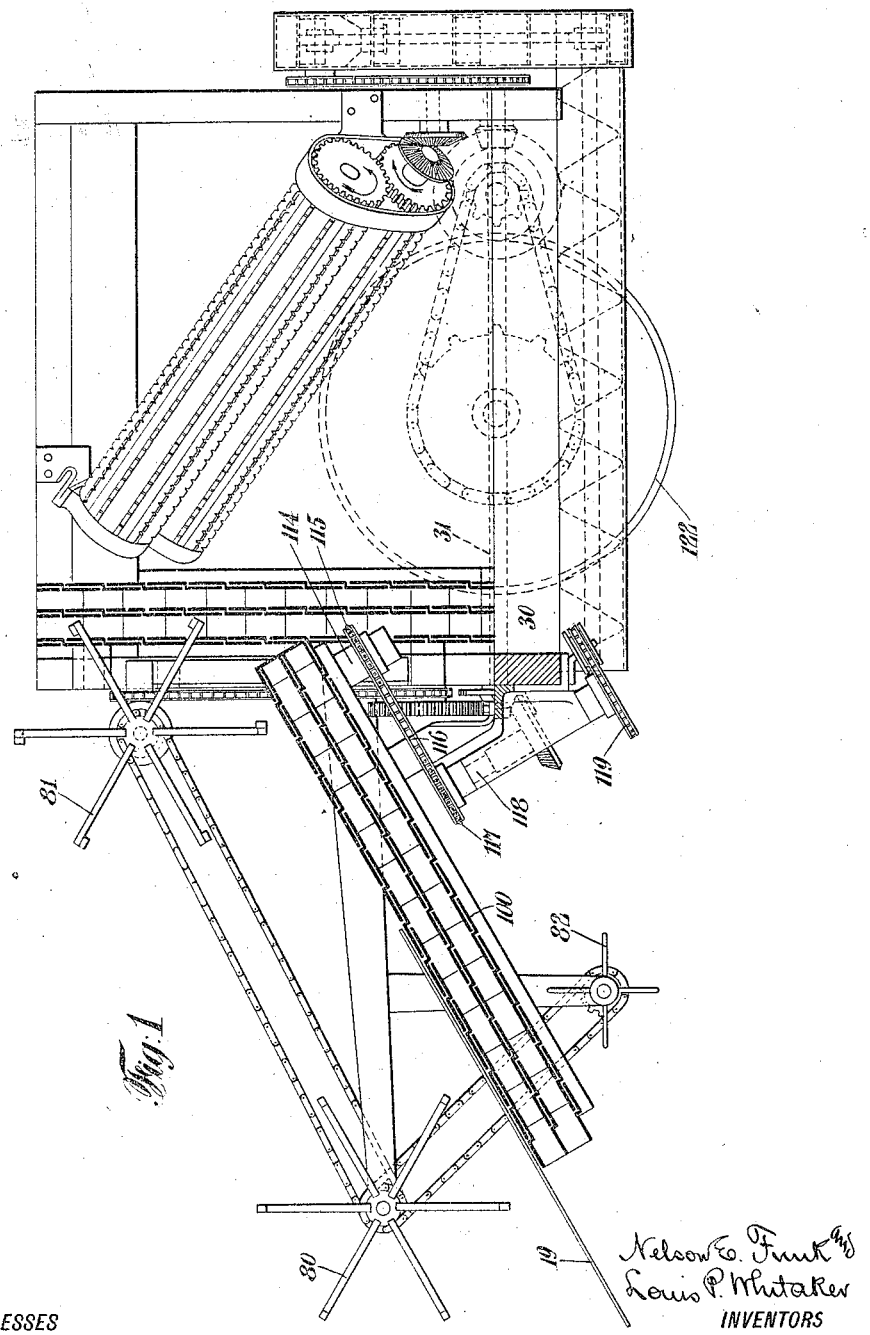

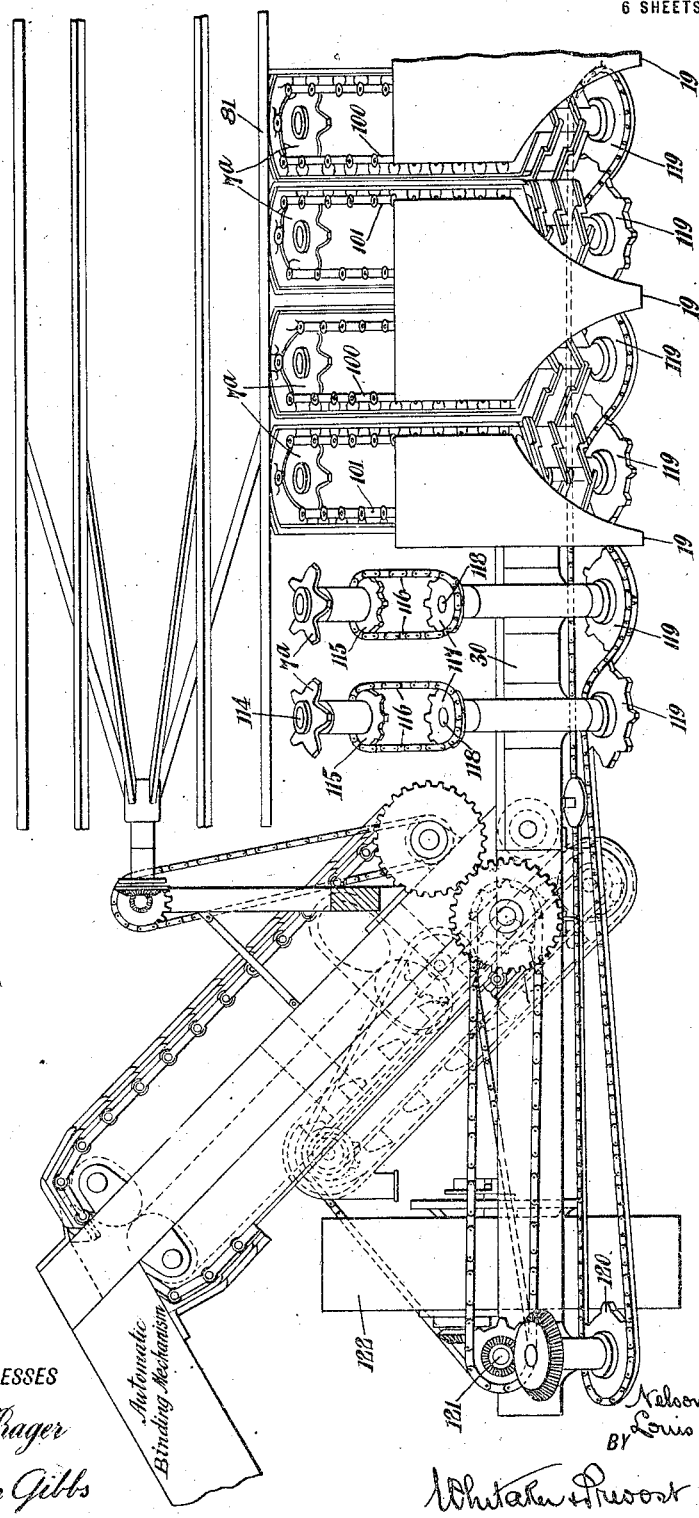

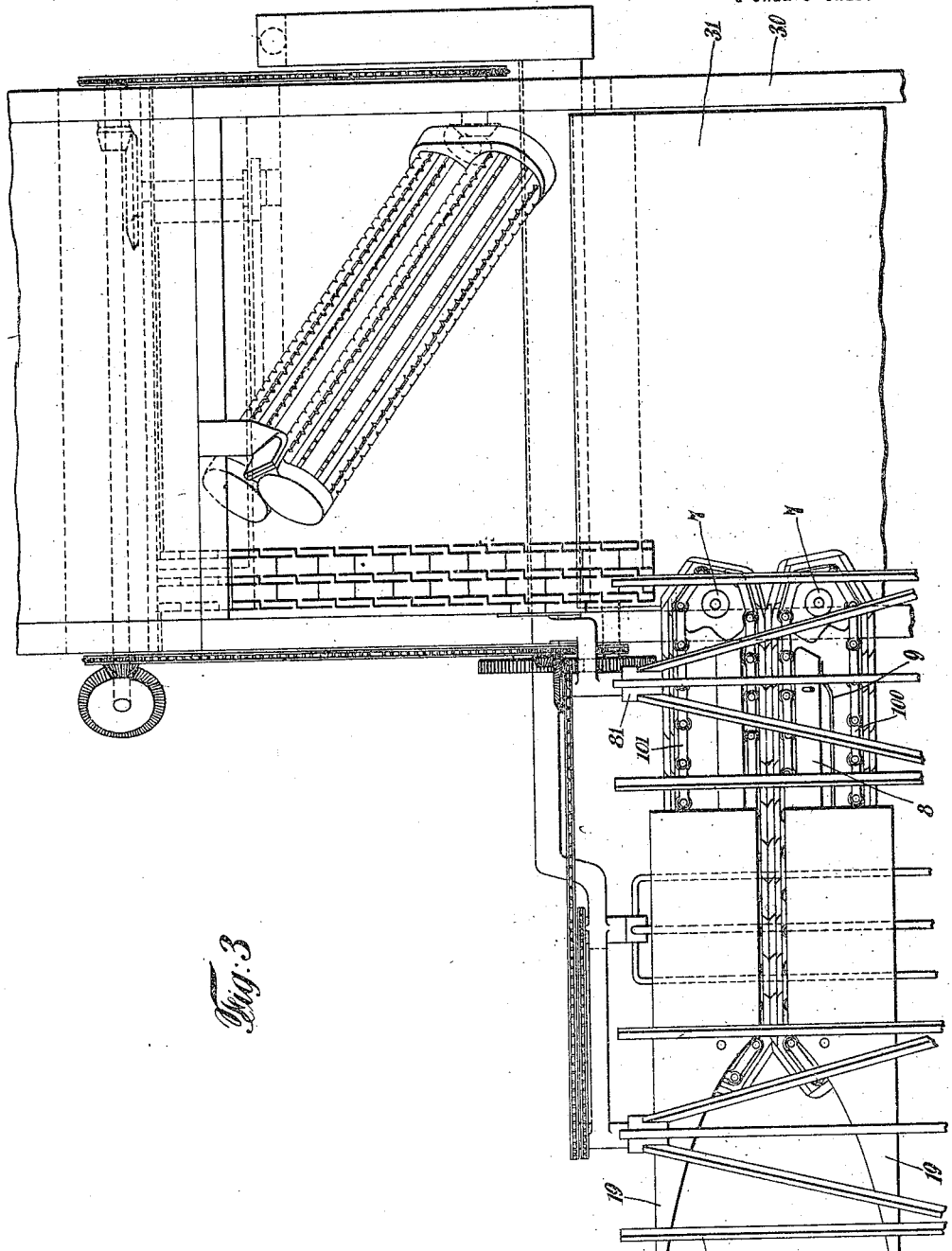

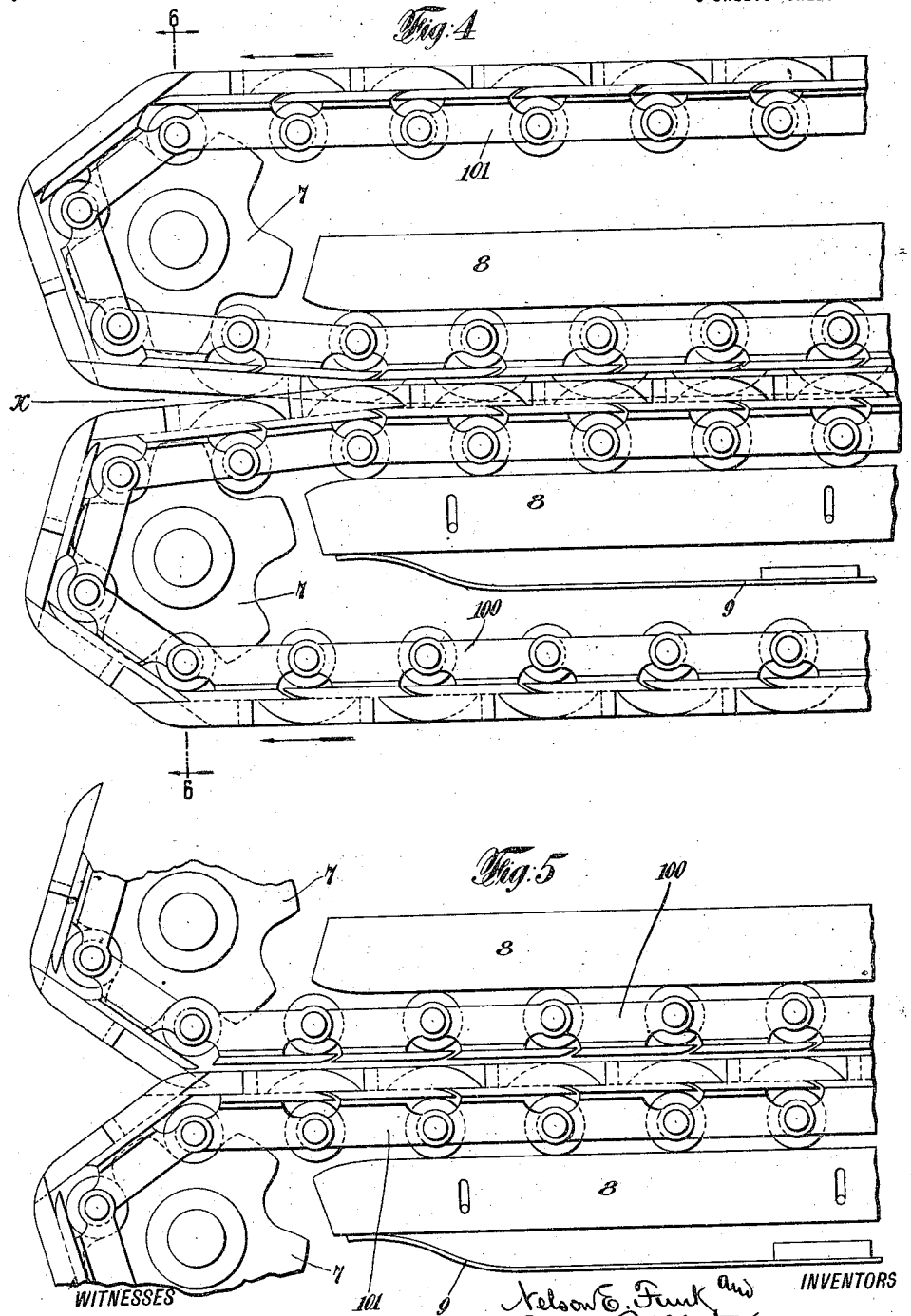

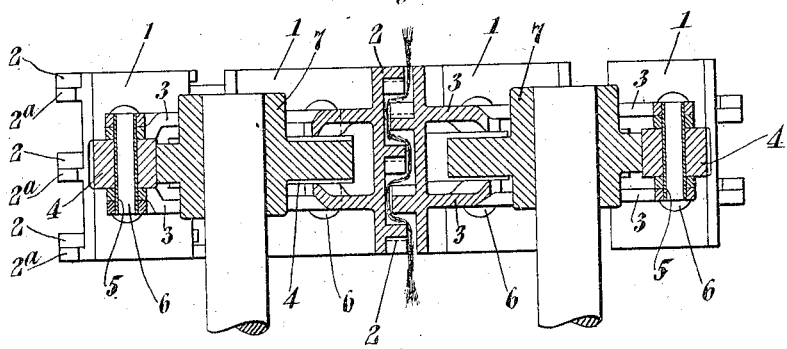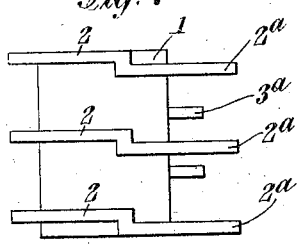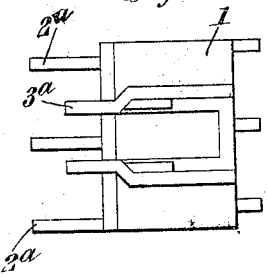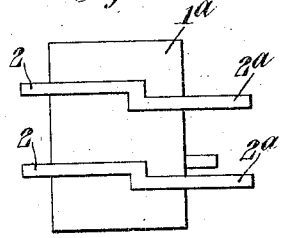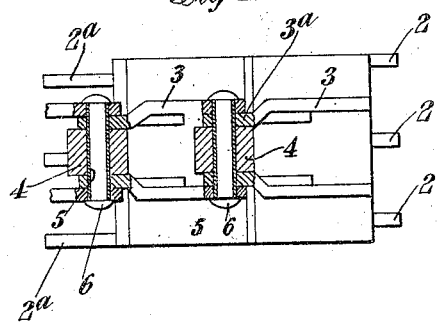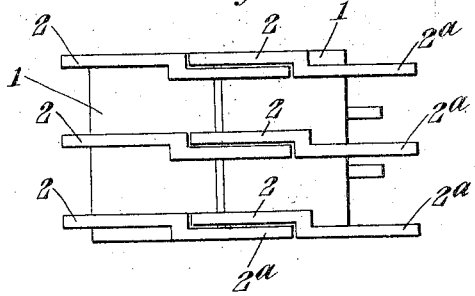

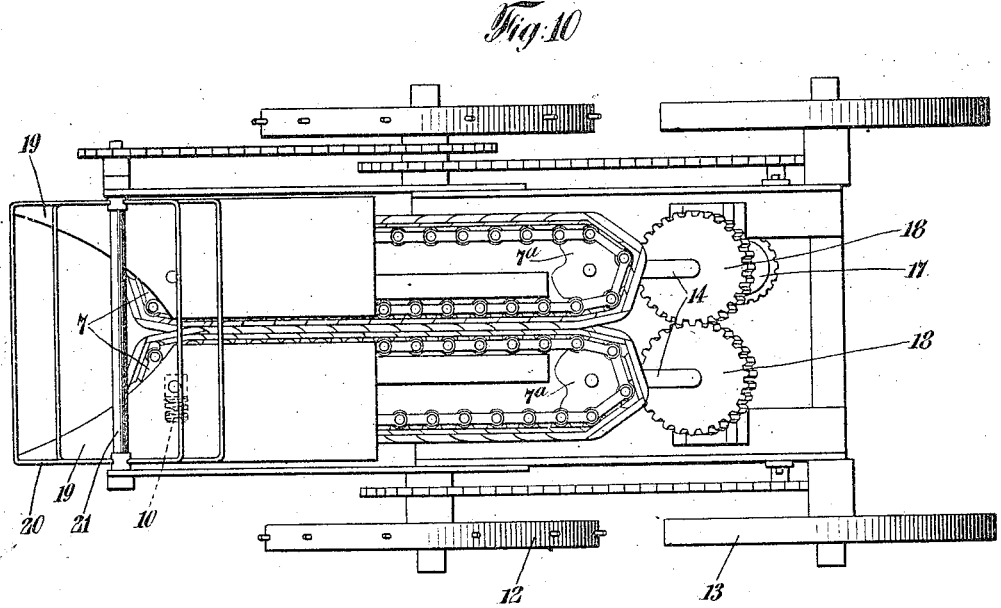
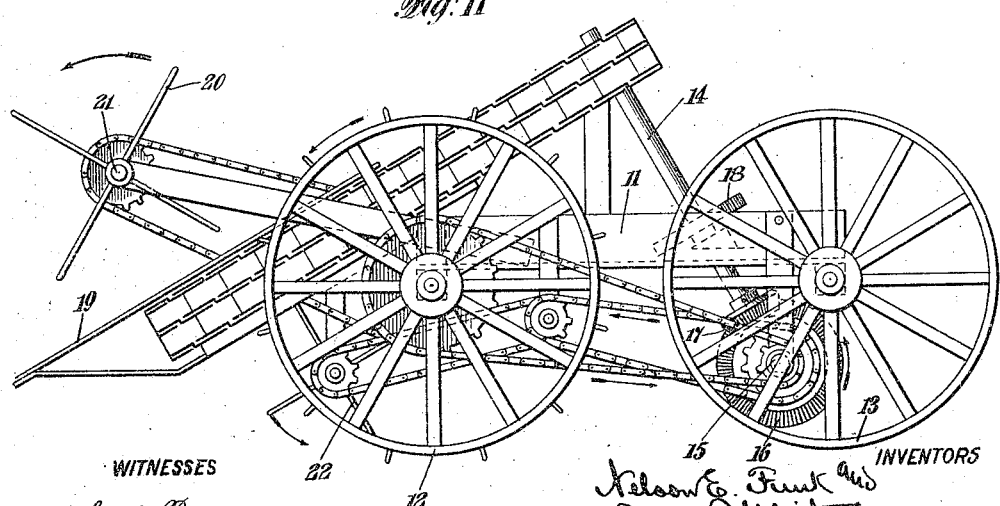

NELSON E. FUNK, OF MONTCLAIR, NEW JERSEY, AND LOUIS P. WHITAKER, OF NEW YORK, N. Y.; SAID FUNK ASSIGNOR TO VICTOR E. FREEMAN, OF NEW YORK, N. Y.

FLAX PULLING AND HARVESTING MACHINE.

1,145,012.           Specification of Letters Patent.        Patented July 6, 1915.

Original application filed April 3, 1914, Serial No. 829,213. Divided and this application filed October 21, 1914. Serial No. 867,723.

*To all whom it may concern:*

Be it known that we, NELSON E. FUNK and LOUIS P. WHITAKER, citizens of the United States, residing, respectively, at Montclair, in the county of Essex and State of New Jersey, and New York, in the county and State of New York, have invented certain new and useful Improvements in Flax Pulling and Harvesting Machines; and we do hereby declare the following to be a full, clear, and exact description of the invention, such as will enable others skilled in the art to which it appertains to make and use the same.

Our invention consists in the novel features hereinafter described, reference being had to the accompanying drawing in which we have shown one embodiment of our invention, selected by us for purposes of illustration, and the said invention is fully disclosed in the following description and claims.

Referring to the said drawings:—Figure 1 represents a longitudinal sectional view taken through a flax harvesting machine embodying our invention, between the opposing pulling chains of one of the pulling units, and showing in elevation a mechanism for removing the seed pods and cups from the plants. Fig. 2 is a front view of a portion of the apparatus showing several pulling units and the seed removing mechanism before mentioned. Fig. 3 is a partial plan view of the machine. Fig. 4 is an enlarged plan view of a portion of one of the pulling units showing the pulling chains in their open positions at the forward ends thereof. Fig. 5 is a similar detailed view showing the chains in closed position at their front ends. Fig. 6 is a sectional view on line 6—6 of Fig. 4. Fig. 7 is a front view of one of the links for one of said chains. Fig. 8 is a rear view of the same. Fig. 9 is a front view of one of the links of the opposing chain. Fig. 10 is a plan view of a small apparatus for pulling flax only and containing a single pulling unit. Fig. 11 is a side elevation of the small apparatus shown in Fig. 10. Fig. 12 is a rear view of adjacent connected clamping plates, parts being shown in section. Fig. 13 is a front view of the same.

Growing flax is ordinarily harvested in one of two ways according to the use to which the product is to be put. If it is harvested for the purpose of obtaining the seed for the production of linseed oil, it is ordinarily cut and thereafter threshed for the removal of the seed in a manner not unlike the handling of other grain. When, however, the flax is desired in order that its fiber may be extracted for the manufacture of linen, it is found that satisfactory commercial results are not obtained if the flax is cut off, and that such satisfactory results can only be obtained when the plants are pulled root and all from the ground. This is a recognized fact in handling flax, and it is also observed that the removal of the roots from the ground enables the farmer to obtain better results from successive crops. The pulling of flax is ordinarily accomplished by hand and is very expensive on account of the labor involved. It will be apparent that, in case flax is harvested for the purpose of producing linseed oil, the straw is a loss and yields no return to the farmer, and, on the other hand, where the flax is pulled for the purpose of utilizing the fiber, it is practically impossible to obtain the seed commercially, as the plants are pulled in a more or less immature state and the seed is lost.

The object of the present invention is to provide mechanical means for enabling the flax to be pulled from the ground with the roots without the use of hand labor, and we also contemplate the embodiment of the flax pulling apparatus hereinafter described in a machine equipped with the usual self-binding mechanism in use in connection with other grains, and provided further with mechanism by means of which the stalks after being pulled are relieved of their seed pods, the seed and pods and any adhering particles of the stalk branches being separately preserved so that they may be dried and threshed or winnowed, or otherwise treated for the separation of the seed which may, therefore, be utilized in the production of linseed oil and other linseed products. It is found that the base of the seed cup or pod, which comprises a tiny button, adheres very strongly to the end of the branch of the plant on which it grows and is apparently intimately connected with the ends of the fibers terminating at such button, and the presence of these cups or buttons persists in the after treatment of the fiber so that it is very advantageous to eliminate them as far as possible in separating the seed pods from the plants and the special mechanism hereinafter described is especially designed to separate substantially all of the buttons, or seed pod bases, as well as the pods and seeds from the plants, so that the stalks with roots attached may be bound up in bundles or otherwise delivered from the machine ready for treatment for the production of linen.

In our former application for Letters Patent of the U. S. filed April 3, 1914, Serial No. 829,213, we have shown, described and claimed a complete flax harvesting machine provided with pulling mechanism, mechanism for combing the stalks for the removal of seed pods, seeds, and buttons, and also with binding mechanism for binding the combed plants, and this application, which is a division of our former application, is directed more particularly to the pulling mechanism for pulling the growing flax from the ground, which is specifically claimed herein.

We will first describe the flax pulling mechanism specifically.

In Figs. 10 and 11 we have illustrated an embodiment of our invention comprising a single pulling unit, and as these units are identical in machines having a plurality of such units, a description of the unit will make clear the entire operation of the pulling mechanism. We have discovered a new and unique mechanism for holding the stalks of the grain against longitudinal movement, which comprises opposing parts provided with separate ribs, or flanges, extending substantially transversely of the grain or flax, the ribs of one of said opposing parts alternating with those of the other, and being constructed and arranged in connection therewith, so that when the grain is gripped between the opposing parts it is deflected back and forth in a serpentine manner between the alternating ribs, the opposing parts having integral portions extending transversely and secured to and supporting all of the ribs thereof. By this means the flax or other similar material can be gripped so as to prevent its being pulled out longitudinally without the necessity for any particular pressure being exerted on the plant by the alternating ribs, and it is also found that the device indicated will hold the plants firmly whether there is a single stalk or a large number of stalks so bent and deflected by the opposing and alternating ribs. The relation between the projections on the opposing plates we designate as "intermeshing" as it is somewhat similar to the relation a tooth of a gear wheel bears to the teeth of an engaged rack or gear wheel between which it enters, and this relation is not to be confused with the ordinary clamping of stalks between flat surfaces either smooth or roughened as the operation of such devices is quite different, there being no clamping in the ordinary sense, but a holding of the stalks against longitudinal movement by the bends imparted to them by the intermeshing projections. In embodying this basic idea in an apparatus for continuously pulling flax we provide an endless band or carrier consisting in this instance of a plurality of plates pivotally connected so as to form an endless arrangement of such plates, said plates being provided with the ribs before referred to and being caused to travel around suitable rollers, the ribs acting in conjunction with opposing ribs alternating therewith on another endless band or carrier formed also, in this instance, of a series of plates similarly arranged and driven, the stalks being gripped between opposed parallel portions of said endless bands or carriers and carried thereby from one end of the unit to the other and the said pair of endless bands or carriers so formed are given a suitable inclination from the horizontal from front to rear so that the stalks are gradually elevated as they are carried to the rear, and in practice the opposing bands are operated toward the rear at substantially the same speed as the machine moves forwardly, the effect of which is to simply pull the stalks out of the ground as the machine progresses.

Various forms of chain plates or links may be used but we have found one desirable and satisfactory construction to be that shown in Figs. 6 to 9 inclusive, in which the plates of one band are provided with three ribs while the plates of the opposing band are provided with two ribs arranged to alternate with the three ribs of the opposing plate. To facilitate the supporting and driving of the bands, we prefer to either connect the plates to the links of a suitable driving chain, or to cast the plates and links integrally as shown in the drawings referred to. Fig. 7, for example, shows the front face of a chain plate 1 provided with three ribs 2, and in order to insure the continuity of the ribs throughout the band, we find it convenient to make these ribs half the width desired for the operative ribs and to form the ribs on each of said plates in two sections as shown at 2 and 2$^a$ out of alinement with each other, the said rib portions 2 and 2$^a$ projecting from the transverse edges of the plates in such a manner that when the plates are in longitudinal alinement the portions 2$^a$ of one plate will occupy positions alongside of the parts 2 of the adjacent plate and vice versa, as shown, for example, in Fig. 13, the effect of which is to produce ribs extending longitudinally of the chain of plates when the plates are in a straight line. It will also be understood that the opposing plates 1ª, or those of the adjacent band are provided with similar rib portions 2 and 2ª in a similar manner, the only difference being that they are so located that the ribs of one band alternate with those of the opposing plate at all times when they are in opposition. In this instance we have shown the back of each of said plates provided with link portions 3 having portions 3ª at one end in closer proximity to each other and, adapted to receive between them a friction roller 4, said link portions 3 and 3ª being provided with suitable apertures to receive the pivotal connections connecting said link portions with the link portions of the adjacent plates. We prefer to pass a hollow cylindrical sleeve 5 through the apertures in the links and the central aperture of the roll 4 which sleeve forms the bearing for the roll and the pivot for the links, and this sleeve is held in position by a rivet 6 which passes therethrough and is provided with a head at each end as indicated in Fig. 6.

The pulling unit comprises two bands, the one formed of links 1 and the other formed of links 1ª, said bands being mounted at each end of the unit on a sprocket wheel 7 or 7ª, see Figs. 10 and 11, and 4 and 5. The adjacent laps of the two bands are held in proper interlocking engagement by suitable guides 8, 8, extending longitudinally of the unit and in order to allow for the slight separation of the opposed plates in case an obstacle or a bunch of material should get between them, and to hold them yieldingly in proper relation with each other, one or both of the guides 8 is provided with a spring. In Figs. 4 and 5 for example, we have shown one of said guides laterally movable and provided with a leaf spring 9, the other being rigidly supported in any suitable manner. It is also preferred that the sprocket wheel 7 on the side adjacent to the yielding guide 8 should also be mounted in movable bearings against suitable retracting springs in order that it may yield laterally slightly if occasion may require. Thus in Fig. 10 we have indicated in dotted lines one of the bearings for the movable sprocket wheel, arranged to slide laterally and provided with a retracting spring 10.

It is desirable to have the links as long as possible longitudinally of the band and at the same time to have the sprocket wheels as small as possible, and we prefer to provide the sprocket wheels as shown in Figs. 4 and 5 with five teeth each, and of very small diameter. With this type of sprocket it will be seen that as the rolls of the chains pass around the front of the sprockets they will present the links successively in a position inclined to the opposing links of the other chain as clearly shown in Fig. 4, thus the space between the ribs is much greater at the point indicated by x in Fig. 4 when a tooth of either of the sprockets 7 is opposite a tooth of the other sprocket, than it is between the inner ends of the same plate. This affords a very considerable opening which facilitates the entrance of the standing grain between the opposing plates and upon a further revolution of the sprocket 7 half of the distance between two teeth, as indicated in Fig. 5, the opposing plates are pressed closely together and their friction rolls immediately pass on to the guides 8 so that such plates are never permitted to separate again until they have reached the rear or upper end of the unit, and during all this time the flax or other material is firmly clamped between the opposing plates and forced into the serpentine relation previously described, by the opposed alternating ribs of the chain plates.

The apparatus shown in Figs. 10 and 11 comprises what might be termed the simplest form, or embodiment of our invention and consists of a main supporting frame 11 mounted on suitable wheels 12 and 13, the said frame being provided with means for supporting the front sprockets 7 which are idle, and also being provided with driving shafts 14 carrying the rear sprockets indicated at 7ª which impart motion to the endless bands. The front wheels 12, in this instance, are the traction wheels and are connected by means of sprocket gearing with a transverse shaft 15 carrying a beveled driving wheel 16 meshing with a beveled pinion 17 on one of the driving shafts 14, the two driving shafts being connected for rotation by intermeshing gears 18. The pulling bands are thus maintained in an inclined position as shown and the front end of the mechanism is provided with suitable guards 19 for deflecting the stalks inward to the grip or bite of the opposed plates. We may provide an over-head reel indicated at 20 supported on a suitable shaft 21 and operated by sprocket or other gearing from the driving mechanism of the machine as indicated in Figs. 10 and 11 to assist in presenting the flax to the pulling mechanism. We also prefer to provide mechanism for knocking off the dirt adhering to the roots, and, in this instance we have shown a beater 22 supported below the forward portion of the pulling chains and connected by sprocket or other gearing with the driving mechanism of the machine for striking the roots as they depend from the chain plates and removing the dirt therefrom.

From a consideration of Figs. 10 and 11 it will be seen that as the machine is propelled forward the traction wheels will drive the chains so that the opposed portions thereof will move rearward, and, preferably, at the same speed as the forward progress of the machine. The stalks will be gripped between the opposing plates in the manner hereinbefore described and the effect upon them of the upward travel of the bands is to pull the stalks vertically out of the ground while the beater 22 knocks off the dirt and the stalks are carried upward and discharged at the rear ends of the pulling chains. The machine illustrated in Figs. 10 and 11 will obviously only pull a narrow swath but it is only necessary to provide a machine with a plurality of these pulling units arranged side by side to pull in a desired width or swath simultaneously, and in the type of machine illustrated in Figs. 1, 2, and 3, we contemplate the provision of five at least of these units, although the number is not material. It will be obvious that the flax may be pulled by the machine shown in Figs. 10 and 11 and discharged rearwardly on the ground and afterward removed in any desired manner for treatment, and it will also be apparent instead of dragging the machine over the ground it may be propelled by a tractor or a suitable engine mounted on the frame of the machine and operatively connected with the pulling mechanism or with the traction wheels or both.

In the embodiment of our invention illustrated in Figs. 1, 2, and 3, we have shown a machine which is provided with a plurality of pulling units, the opposing bands of which are indicated at 100 and 101 respectively, supported in front of a horizontally disposed receiving grain platform 30 over which passes a horizontal apron 31. In this instance the shafts 114 which carry the upper sprocket wheels for the pulling units are provided with sprocket wheels 115 connected by sprocket chains 116 with sprockets 117 on inclined shafts 118 provided with sprocket wheels 119 at their lower ends and said sprocket wheels 119 are driven by a continuous chain passing around the successive wheels 119 in opposite directions, as shown in Fig. 2, thus imparting motion from a driving sprocket 120 which is geared with the driving shaft 121 of the machine. The frame work of the machine is supported upon a suitable bull wheel 122 which may be operatively connected with the driving shaft 121 by means of beveled gearing as indicated in Fig. 2, or the driving shaft 121 may be driven by a motor supported on a machine or by a connection with the motor of a tractor employed to draw the machine over the ground as may be found most desirable. In Fig. 2 the pulling bands of one unit have been removed in order to show the gearing therefor.

In connection with the pulling mechanism we have shown in Figs. 1, 2, and 3, a reel 80 for assisting the grain to enter between the opposing bands of the several pulling units and a supplementary reel 81 for facilitating the discharge of the stalks on to the horizontal carrier 31, and we have also shown the beater 82 located below the forward portions of the various pulling units for knocking the dirt off the roots of the plants, the parts being connected by sprocket gearing or other suitable gearing with the driving mechanism of the machine.

It will be understood that as the opposing bands herein referred to are designed to grip and pull or convey stalks of flax or other grain which have a very small diameter and are practically smooth on the exterior, it is important that the intermeshing longitudinally extending ribs of the pulling or gripping units shall be held very firmly in engagement as any vibration thereof or movement of the ribs of one band with respect to those of the other, would tend to loosen their hold on the slender stalks which are confined and held only by the fact that they are bent back and forth by the intermeshing ribs. It is important therefore that the endless bands shall have integral transverse portions connected to all the ribs of the band for supporting them and holding said ribs firmly against any change of position with respect to each other. In the construction herein shown and described the plate portions of the endless bands connect the ribs and support them rigidly transversely of the band throughout its length.

What we claim and desire to secure by Letters Patent is:—

1. Mechanism for gripping and carrying grain stalks comprising opposed members each provided with a plurality of ribs disposed transversely with respect to the stalks, the ribs of one of said members being out of transverse alinement with and intermeshing with those of the other member, and each of said members being provided with integral transversely extending body portions connected with all of the ribs of said member and maintaining them in fixed relation with each other and with said member.

2. Mechanism for gripping and carrying grain stalks comprising opposed members each provided with a plurality of ribs disposed transversely with respect to the stalks, the ribs of one of said members being out of transverse alinement with and intermeshing with those of the other member, and each of said members being provided with integral transversely extending body portions connected with all of the ribs of said member and maintaining them in fixed relation with each other and with said member, the ribs of each member being separated a greater distance than the width of the ribs of the opposing member.

3. Mechanism for gripping and carrying grain stalks, comprising a pair of endless bands arranged side by side so that a portion of one band is parallel to and opposed to a portion of the other band at all times, each of said bands being provided with a plurality of projecting ribs disposed longitudinally thereof and extending throughout the entire length of the band, the ribs of one band being out of alinement transversely with and intermeshing with those of the other band throughout the parallel opposed portions of said bands, said bands being provided with integral transversely extending portions secured to and supporting all of the ribs thereof, and means for driving said endless bands.

4. Mechanism for gripping and carrying grain stalks comprising a pair of endless bands disposed vertically and arranged side by side so that a portion of one band is parallel and opposed to a portion of the other band at all times, said bands being inclined upwardly from one end to the other of said parallel portions, each of said bands being provided with a plurality of projecting ribs disposed longitudinally thereof and extending throughout the entire length of the band, the ribs of one band being out of alinement transversely with and intermeshing with those of the other band throughout the parallel opposed portions of said bands, said bands being provided with integral transversely extending portions secured to and supporting all of the ribs thereof, and holding them from movement with respect to each other, and means for driving said endless bands so that the opposed portions move in the same direction and at the same speed.

5. A flax pulling mechanism comprising a pair of endless bands having opposed parallel vertical portions, said bands having their rear ends at a greater distance from the ground than their forward ends and extending upwardly and rearwardly in an inclined direction, said bands being each provided with a plurality of longitudinal ribs alternating with and intermeshing with the ribs of the other band, and each of said bands having transverse integral portions connecting and supporting all of the said ribs thereof, means for advancing the bands forwardly over the ground, and means for driving said bands in directions to cause the opposed portions thereof to move rearwardly at substantially the same rate of speed as the forward movement of the bands.

6. A flax pulling mechanism comprising a pair of endless bands having opposed parallel vertical portions, said bands having their rear ends at a greater distance from the ground than their forward ends and extending upwardly and rearwardly in an inclined direction, said bands being each provided with a plurality of longitudinal ribs alternating with and intermeshing with the ribs of the other band, and each of said bands having transverse integral portions connecting and supporting all of the said ribs, means for advancing the bands forwardly over the ground, means for driving said bands in directions to cause the opposed portions thereof to move rearwardly at substantially the same rate of speed as the forward movement of the bands, and means for imparting movement to the opposed portions of the bands adjacent to the lower or receiving end thereof transversely of the path of movement of the bands, to cause them to recede from and approach each other.

7. A flax pulling mechanism comprising a pair of endless bands having opposed parallel vertical portions, said bands having their rear ends at a greater distance from the ground than their forward ends and extending upwardly and rearwardly in an inclined direction, said bands being each provided with projecting portions disposed transversely of the stalks and forming continuous longitudinal ribs of uniform cross section throughout the parallel portions of the bands, said bands being each provided with transversely disposed portions having a rigid connection with all of the ribs of the band for holding them in fixed relation with each other, and the ribs of one band alternating and intermeshing with the ribs of the other band, means for driving said bands to cause the opposed portions thereof to move rearwardly at the same speed, and means for advancing the bands forwardly over the ground.

8. A flax pulling mechanism comprising a pair of endless bands having opposed parallel vertical portions, said bands having their rear ends at a greater distance from the ground than their forward ends and extending upwardly and rearwardly in an inclined direction, said bands being each provided with projecting portions disposed transversely of the stalks and forming continuous longitudinal ribs of uniform cross section throughout the parallel portions of the bands, said bands being each provided with transversely disposed portions having a rigid connection with all of the ribs of the band for holding them in fixed relation with each other, and the ribs of one band alternating and intermeshing with the ribs of the other band, means for driving said bands to cause the opposed portions thereof to move rearwardly at the same speed, means for advancing the bands forwardly over the ground, and guiding devices on opposite sides of the parallel portions of said bands between the front and rear ends of said parallel portions for holding the said ribs of the opposed portions in operative relation.

9. Mechanism for gripping and carrying flexible stalks, comprising a pair of endless carriers having opposed parallel portions and provided with a plurality of separate gripping plates, said plates being each provided with projecting ribs disposed transversely of the stalks and alternating with the ribs of the opposed plate of the other carrier for gripping the stalks and deflecting them out of a straight line.

10. Mechanism for gripping and carrying flexible stalks, comprising a pair of endless chains having opposed parallel portions, links of said chains being provided with clamping plates, each of said plates having clamping ribs disposed transversely with respect to the stalks, and alternating with the ribs of the plates of the opposing chain.

11. Mechanism for gripping and carrying flexible stalks comprising a pair of endless carriers having parallel portions, each of said carriers being provided with a plurality of separate plates, each of said plates being provided with ribbed portions disposed transversely of the stalks and alternating with the ribs of the plates of the opposing carrier, the ribbed portions of the plates of each carrier extending beyond the transversely disposed edges of the plates and overlapping portions of adjacent plates, when in alinement therewith.

12. Mechanism for gripping and carrying flexible stalks comprising a pair of endless carriers, having parallel portions, each of said carriers being provided with a plurality of separate plates, each of said plates being provided with ribbed portions disposed transversely of the stalks and alternating with the ribs of the plates of the opposing carrier, the ribbed portions carried by each plate comprising portions in different longitudinal planes and projecting beyond the transverse edges of the plates, whereby the rib portions of one plate will overlap the rib portions of the adjacent plates of the carrier when in alinement therewith, and form continuous ribs.

13. A flax pulling mechanism comprising a portable supporting frame, a pair of endless chains connected therewith and provided with parallel portions, each of said chains being provided with clamping plates, said plates having projecting ribs disposed substantially horizontally and alternating with the ribs of the plates of the opposing chain, said chains having their rear ends supported a greater distance above the ground than the forward ends, and means for driving said chains so as to effect the movement of said opposed portions from front to rear.

In testimony whereof we affix our signatures, in the presence of two witnesses.

NELSON E. FUNK.
LOUIS P. WHITAKER.

Witnesses:
HARRIET S. HAGEN,
VICTOR E. FREEMAN.